March 5, 1929.  C. E. STRYKER  1,704,546

TRANSFORMER UNIT

Filed April 11, 1927

Inventor:
Clinton C. Stryker
By: Williams, Bradbury,
McCaleb & Hinkle
Att'ys.

Patented Mar. 5, 1929.

1,704,546

UNITED STATES PATENT OFFICE.

CLINTON E. STRYKER, OF HIGHLAND PARK, ILLINOIS. ASSIGNOR TO FANSTEEL PRODUCTS COMPANY, INC., OF NORTH CHICAGO, ILLINOIS, A CORPORATION OF NEW YORK.

TRANSFORMER UNIT.

Application filed April 11, 1927. Serial No. 182,609.

My invention relates to a transformer unit and pertains especially to the type of a unit used to charge storage batteries, supply power for radio equipment, for operating railway signal relays, etc.

The object of my invention is to provide a unit in which the voltage applied to the rectifier may be carefully regulated to compensate for different battery loads, different internal characteristics of the rectifier cell, and other operating conditions.

A further object of my invention is to provide an improved transformer with a secondary provided with a series of increments, whereby the secondary voltage range may be varied in small steps throughout a wide range by the use of a small number of terminal posts.

Other objects will be apparent as the detailed description of my invention proceeds.

In the accompanying drawing wherein similar reference characters refer to like parts throughout:

The most practical and permanent electrolytic rectifier now on the market is the type in which tantalum and lead electrodes are immersed in an electrolyte of dilute sulphuric acid to which has been added a small amount of a salt of a metal of the iron group.

These rectifiers are well known and need no further description. However, for optimum results it has been found that these rectifiers should be operated within a certain definite voltage range. The life of the tantalum electrode depends, to a certain extent, on the nature of the film formed and this in turn is a function of the voltage applied to it; also different charging rates may be required, and the charging rate of a storage battery naturally falls off as the charging process nears completion.

Various methods have been devised for regulating the secondary voltage to compensate for these conditions, and it is common practice to use a variable resistance in series with the circuit to accomplish this result.

I have designed a transformer with a number of taps so arranged that it is possible to secure a secondary voltage range of from ¼ to 25½ volts in ¼ volt steps. This arrangement permits an adjustment of charging rate without the use of a resistance unit with resulting economies of operation. Also this transformer may be used to charge from 1 to 7 cells of batteries with one rectifier cell.

Figure 1:
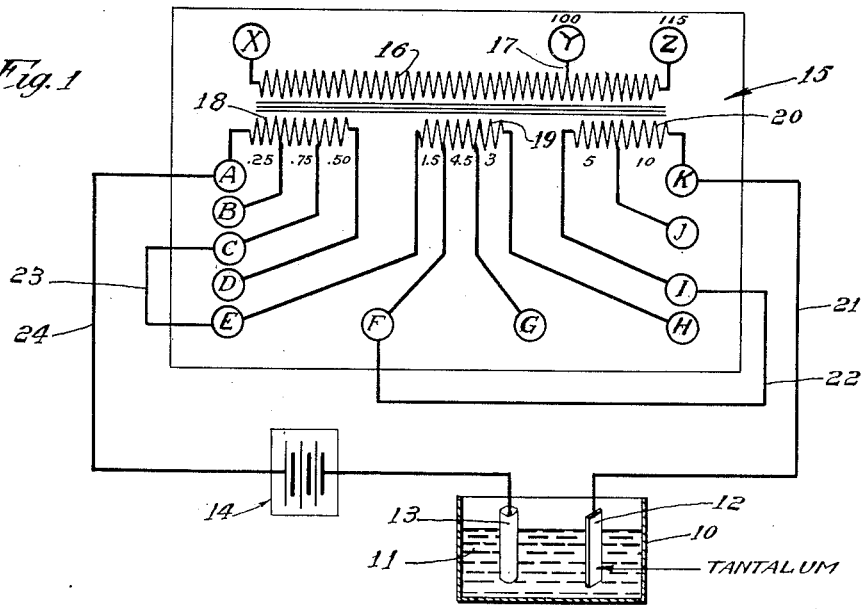
Fig. 1 shows diagrammatically the improved unit.

In Fig. 1 the rectifier is represented by a receptacle 10 of suitable acid proof material, preferably glass, which contains an electrolyte 11 in which are immersed a tantalum electrode 12 and a lead electrode 13. The lead electrode is connected to the negative terminal of storage battery 14.

The transformer 15 includes a primary winding 16, preferably for use in a 115 volt circuit. This primary winding is tapped at 17 so that the primary may also be used at 100 volts. The secondary is divided into three windings, 18, 19 and 20, all of which are wound around the same core. The first secondary winding 18 is tapped to provide three increments and leads are taken from these increments to terminals A, B, C, and D. These increments are so proportioned that the potential difference between A and B is .25 volts; between B and C is .75 volts; and between C and D is .5 volts.

The second secondary winding 19 is divided into increments, the leads of which are connected to terminals E, F, G, and H, the voltage drop across the increments being 1.5, 4.5 and 3.0, respectively.

The third secondary winding is tapped to provide two increments with leads to terminals I, J and K, the voltage drop across the increments being 5 and 10, respectively.

The operation of my unit may be described as follows: Suppose that a given rectifier cell charges a 6 volt storage battery at ½ ampere when the secondary voltage is 17.25 volts. A conductor 21 from the tantalum electrode is connected to terminal K. Terminal I is connected to terminal F by conductor 22. Terminal E is connected to terminal C by conductor 23, and terminal A is connected to the positive bolt of the storage battery by conductor 24.

Figure 2:
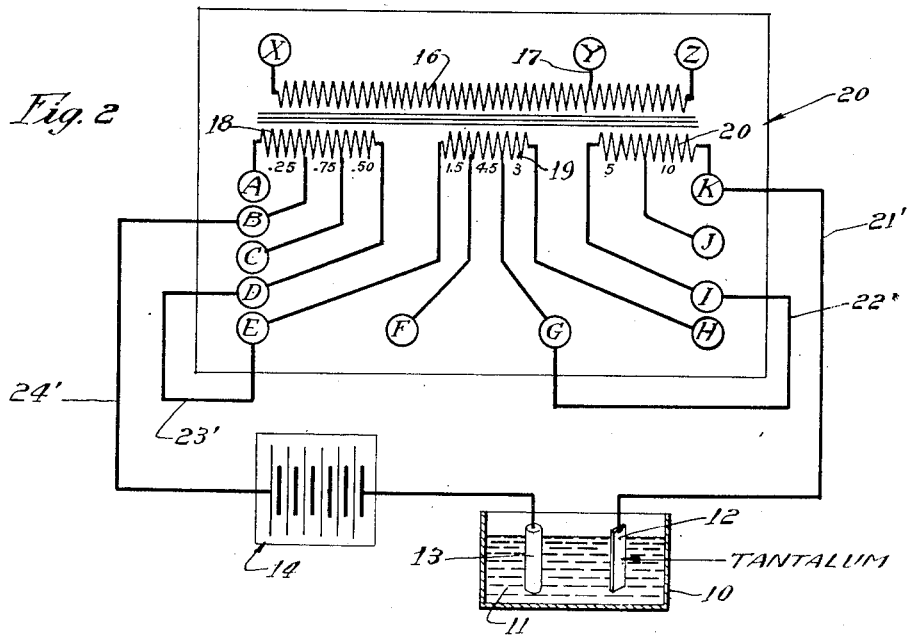
Fig. 2 shows the same unit connected to give a different secondary voltage.

By adding the increments shown in Fig. 1, it may be readily seen that the secondary voltage will be 17.25. If a 12 volt battery is to be charged and a voltage of 22¼ is required, connections may be made as shown in Fig. 2. It will be apparent that should the charging rate decrease for any reason, it may be adjusted by stepping up the voltage the required amount.

While I have described in detail a preferred embodiment of my invention, it is to be understood that I am not limited to the details shown, except as defined by the following claims.

I claim:

1. A transformer provided with a primary winding and a plurality of secondary windings, taps dividing the secondary windings into successive increments in the ratio of 1:3:2, and means whereby the increments may be selectively connected to another increment or series of increments whereby the secondary voltage may be varied in small steps by the use of a small number of terminal posts.

2. A transformer whose secondary is provided with taps dividing it into successive increments in the ratio of 1:3:2 whereby equal voltage increments may be obtained from different combinations.

3. In a transformer, a primary winding, a plurality of secondary windings, the secondary windings being divided into successive increments in the ration of 1:3:2, the smallest increment of one winding corresponding to the sum of the increments of another winding and means whereby the increments may be selectively connected to other increments or series of increments whereby the secondary voltage may be varied in small equal steps throughout a wide range by the use of a small number of terminal posts.

In witness whereof, I hereunto subscribe my name this 6th day of April, 1927.

CLINTON E. STRYKER.